United States Patent Office 3,481,920
Patented Dec. 2, 1969

3,481,920
AZETIDINONES
William W. Hargrove, Indianapolis, Ind., assignor to Eli Lilly and Company, Indianapolis, Ind., a corporation of Indiana
No Drawing. Filed Oct. 22, 1965, Ser. No. 502,331
Int. Cl. C07d 87/26
U.S. Cl. 260—239
6 Claims

ABSTRACT OF THE DISCLOSURE

Novel 2,2-disubstituted-3-azetidinones, optionally substituted in addition at the 1 and 4 positions, useful as hypotensive agents.

---

This invention relates to novel azetidinones and to intermediates useful in the preparation thereof. More particularly, it relates to 2,2-disubstituted 3-azetidinones, 2,2,3-trisubstituted azetidines, and 2,2,3,3-tetrasubstituted azetidines derivable therefrom.

The preparation of certain 3-substituted 2-azetidinones isomeric with the compounds of the present invention is recorded by Testa et al. in Ann., 614, 158–166 (1958), and in Ann., 625, 95–98 (1959). The same author, in U.S. Patent 3,076,799 (Feb. 5, 1963), teaches the preparation of 3,3-disubstituted azetidines from the 3-substituted 2-azetidinones. Additionally, 1-acyl 3-substituted azetidines are described by Testa et al. in U.S. Patent 3,037,019 (May 29, 1962). Other 1,3-disubstituted azetidines are described by Testa et al. in U.S. Patent 3,028,378 (Apr. 3, 1962). To date, however, the art does not appear to reveal that either the 2,2-disubstituted 3-azetidinones, the 2,2,3-trisubstituted azetidines, or the 2,2,3,3-tetrasubstituted azetidines derivable therefrom, as taught herein, have ever been prepared.

It is an object of this invention to furnish novel 2,2-disubstituted 3-azetidinones which are hypotensive agents. Another object is to provide a process for the synthesis of 2,2-disubstituted 3-azetidinones. A further object is to provide α'-halo α-amino ketones, useful as intermediates in the synthesis of 2,2-disubstituted 3-azetidinones. Another object is to provide novel 2,2,3-trisubstituted and 2,2,3,3-tetrasubstituted azetidines possessing activity as CNS stimulants.

In fulfillment of the above and other objects, this invention provides a group of novel compounds of the following Formulas I, II, and III, or the acid addition salts thereof:

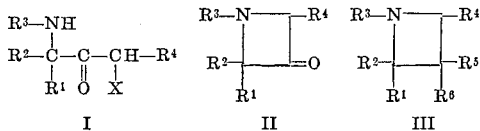

wherein:
$R^1$ and $R^2$, when taken separately, represent $C_1$–$C_5$ alkyl, $C_4$–$C_8$ cycloalkyl, alkoxy($C_1$–$C_5$)alkyl, or phenyl;
$R^1$ and $R^2$, when taken together with the carbon atom to which they are attached, represent $C_4$–$C_8$ cycloalkyl;
$R^3$ represents hydrogen, $C_1$–$C_5$ alkyl, $C_4$–$C_8$ cycloalkyl, or phenyl;
$R^4$ represents hydrogen, $C_1$–$C_5$ alkyl, $C_4$–$C_8$ cycloalkyl, or alkoxy($C_1$–$C_5$)alkyl;
$R^5$ represents hydrogen, hydroxy, cyano, halogen, or $C_1$–$C_5$ alkanoyloxy;
$R^6$ represents hydrogen, hydroxy, $C_1$–$C_5$ alkyl, di($C_1$–$C_5$ alkyl)amino, $C_1$–$C_5$ alkyloxy, $C_4$–$C_8$ cycloalkyl, phenyl-substituted $C_1$–$C_5$ alkyl, or phenyl; and
X represents bromine or chlorine.

The acid addition salts of the bases represented by the above formulas can be prepared employing for example the following acids: hydrochloric, hydrobromic, hydriodic, sulfuric, phosphoric, oxalic, and the like, all of which are generally regarded as forming pharmaceutically acceptable acid addition salts.

In the above formulas, $C_1$–$C_5$ alkyl can be illustratively methyl, ethyl, n-propyl, isopropyl, n-butyl, sec.-butyl, n-amyl, isoamyl, t-amyl and the like.

The phenyl ring may have a wide variety of substituents without departing from the spirit of the invention, including halogens, such as chlorine, bromine, iodine, and fluorine; $C_1$–$C_5$ alkyl groups, such as those illustrated above; haloalkyl, such as trifluoromethyl, trichloromethyl, pentafluoroethyl, iodomethyl, bromoethyl, dichloromethyl and the like; and alkoxy, such as methoxy, ethoxy, propoxy, isopropoxy, n-butoxy and the like. Thus, illustrative substituted phenyl groups can include o-iodophenyl, m-fluorophenyl, o-chlorophenyl, o-bromophenyl, m-bromophenyl, p-bromophenyl, p-tolyl, o-isoamylphenyl, m-xylyl, p-iodophenyl, m-trifluoromethylphenyl, p-pentafluoroethylphenyl, p-trichloromethylphenyl, m-ethoxyphenyl, anisyl, and the like.

In the above formulas, $C_1$–$C_5$ alkanoyloxy refers to acetoxy, propionoxy, butyroxy, valeryloxy, isobutyroxy, and isovaleryloxy.

Di($C_1$–$C_5$ alkyl)amino can be illustratively $(CH_3)_2NH$, $(C_2H_5)_2NH$, $(n$-$C_3H_7)_2NH$, $(i$-$C_3H_7)_2NH$, $(n$-$C_4H_9)_2NH$, $(sec.$-$C_4H_9)_2NH$, $(n$-$C_5H_{11})_2NH$, $(i$-$C_5H_{11})_2NH$, $[(C_2H_5)(C_4H_9)]NH$, and the like.

In the above formulas, $C_1$–$C_5$ alkyloxy refers to the $C_1$–$C_5$ alkyl groups above, attached at any available position of the defined $C_1$–$C_5$ alkyl group through an intervening oxygen atom. They may include illustratively methoxy, ethoxy, n-propoxy, isopropoxy, n-butoxy, isobutoxy, sec.-butoxy, tert.-butoxy, n-amyloxy, isoamyloxy, sec.-amyloxy, and tert.-amyloxy.

Lower alkoxy ($C_1$–$C_5$) alkyl refers to the lower alkyl groups methyl, ethyl, n-propyl, or isopropyl, attached at any available position of the defined lower alkyl group through an intervening oxygen atom to a $C_1$–$C_5$ alkyl group as defined above, and can be illustratively methoxyethyl, methoxypropyl, ethoxymethyl, ethoxyethyl, n-propoxybutyl, ethoxy-n-amyl, n-butoxyethyl, and the like.

Phenyl-substituted $C_1$–$C_5$ alkyl can be illustratively benzyl, β-(m-xylyl)ethyl, phenethyl, p-bromophenethyl, m-chlorobenzyl, m-ethylphenethyl, p-isopropylbenzyl, p-methoxyphenethyl, m-ethoxyphenethyl, p-propoxybenzyl, and the like.

In the above formulas, the cycloalkyl rings can be illustratively cyclobutyl, cyclopentyl, cyclohexyl, cycloheptyl, cyclooctyl, methylcylopentyl, ethylcyclohexyl and the like.

The novel compounds illustrated by Formula I, supra, are obtained by halogenation in acetic acid solution of an α-amino ketone in the form of its acid addition salt as illustrated by Reaction Sequence I:

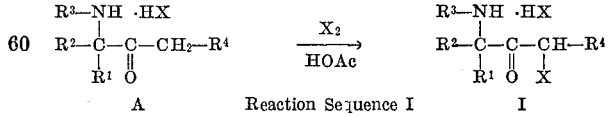

A      Reaction Sequence I      I

The starting α-amino ketone (A) in Reaction Sequence I is conveniently prepared according to the method of Easton et al., U.S. Patent 3,067,101 (1962).

The preparation of I is convenienty carried out by allowing the halogen, for example bromine, to react with the α-amino ketone acid addition salt in glacial acetic acid solution to yield the α'-bromo α-amino ketone hydrobromide, which separates from the reaction product mixture, is filtered off, and recrystallized from a suitable solvent. Owing to the inherent instability of an α′-halo α-amino ketone, it is preferably kept in the form of its acid addition salt.

In a preferred method of synthesis, the α-amino ketone acid addition salt is dissolved in glacial acetic acid, the solution stirred and cooled in an ice bath, and gaseous hydrogen bromide introduced into the solution for about 30 minutes. The reaction mixture is allowed to warm to ambient room temperature, bromine added dropwise with stirring over a period of about one hour, and stirring continued for 5 additional hours. The α′-halo α-amino ketone hydrobromide, which separates from the reaction product mixture, is filtered off and recrystallized from chloroform. The excess hydrogen bromide added during the process has been found to aid in the utilization of the α-amino ketone to yield the α′-halo α-amino ketone.

While this method of treating a ketone with a halogenating agent is a well-known reaction, the application to α-amino ketones appears to be new, there being no indication in the art of the halogenation of an α-amino ketone by this procedure, which procedure serves to provide novel compounds previously unavailable by any other method.

Where $R_3$ represents phenyl-substituted $C_1$–$C_5$ alkyl in Formula I, supra, difficulty is encountered in preparing the α′-halo α-amino ketones by the described process, as halogenation appears to take place not only on the methylene carbon adjacent to the carbonyl but extraneously in the phenyl-substituted $C_1$–$C_5$ alkyl group. To obviate this difficulty and to make it possible to provide a wide range of intermediates useful in preparing the novel azetidinones and derivatives of this invention, a novel method of synthesis of the desired ketones has been developed. This method is described more fully in the copending application of Easton et al., Ser. No. 502,359, filed this even date. In the Easton et al. process, a solution of an acylamido acetylene in an inert solvent is treated with a halogenating agent such as bromine, chlorine, or iodine to obtain the α′-halo α-amino ketone represented by Formula I in the form of its acid addition salt.

The α′-halo α-amino ketones synthesized by the methods outlined above are useful as intermediates in the preparation of the novel 3-azetidinones (II) of this invention according to Reaction Sequence II which follows:

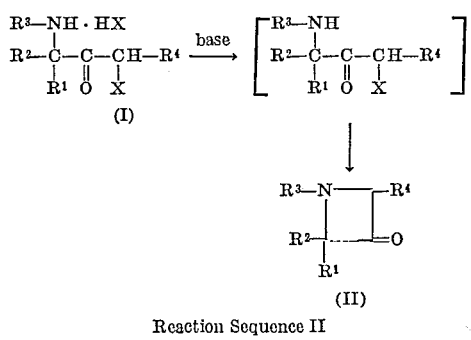

Reaction Sequence II

In both Reaction Sequence I and Reaction Sequence II, $R^1$, $R^2$, $R^3$, $R^4$, and X have the same meanings as hereinbefore.

Reaction Sequence II is conveniently carried out by allowing the α′-halo α-amino ketone (I) acid addition salt to react in dimethylformamide with a mild base, illustratively, sodium bicarbonate, under an atmosphere of nitrogen, the nitrogen atmosphere being used to protect the azetidinone from oxidation by air. The said reaction mixture is stirred for about 30 minutes, then water is added dropwise until the volume of the reaction mixture is doubled, and stirring is continued under nitrogen for 2 additional hours to assure substantial completion of the reaction. The water aids in solubilizing the reactants and bringing the reaction to completion.

The 3-azetidinone produced thereby is isolated by diluting the basic solution with water and then making the solution more strongly basic. The aqueous solution is shaken with ether to extract the basic nitrogenous product. The ether extracts are washed with water, and the basic nitrogenous product is extracted from the ether with dilute aqueous hydrochloric acid, thus forming the acid addition salt of the 3-azetidinone. The aqueous acid solution is washed once with ether to remove impurities, then made basic with aqueous sodium hydroxide, and the crude amine product is extracted with ether. The ether solution is washed once with water and then dried by adding dry benzene and distilling in vacuo, thus azeotropically distilling with the benzene any water present. The oily residue is then fractionally distilled, suitably through a spinning-band column at reduced pressure. The 3-azetidinones darken rapidly in air, apparently decomposing in the process, and are therefore handled as little as possible after being distilled. The acid addition salts can be conveniently prepared by methods well-known to the art, the salts thus providing stable forms in which the 3-azetidinones can be kept.

The novel substituted azetidines represented by Formula III, supra, can be prepared utilizing the unique reactivity exhibited by the carbonyl group, a reactivity enhanced by the location of said carbonyl group opposite a nitrogen atom in a four-membered heterocyclic ring. This carbonyl group undergoes a number of well-known addition reactions, for example, with the elements of water, alcohol, or hydrogen cyanide, to yield hydrates, alcoholates (hemiketals) or cyanhydrins, respectively. The 3-azetidinones also react readily with Grignard reagents and organolithium compounds to yield the expected tertiary alcohols. The carbonyl group can be reduced using a reagent such as sodium borohydride to yield the 3-azetidinol, and the said azetidinol can in turn be halogenated with a reagent such as thionyl chloride to produce a 3-chloroazetidine.

The 3-azetidinols behave as do other alkanols or cycloalkanols in being readily esterified by treatment with an acid anhydride.

The novel 3-azetidinones have interesting hypotensive activity. In addition, they serve as intermediates in the preparation of the novel 3-azetidinols and azetidines represented by Formula III above. The azetidinols possess CNS stimulant properties and the azetidines are blood pressure-lowering agents.

The hypotensive properties of the novel compounds of this invention can be utilized by administering the compounds in a composition adapted for oral or parenteral administration, oral administration being especially preferred because of the ease and convenience associated therewith. Thus, the compositions can be in the form of a compressed tablet or a filled capsule, as well as in the form of a solution or suspension suitable for oral or intramuscular administration.

The interesting hypotensive activity is shown when the compounds are administered orally to rats made hypertensive by the well-known Goldblatt method. Doses of 20–40 mg./kg. orally cause a significant lowering of the blood pressure in the test animals.

The novel compounds possessing CNS stimulant properties can be utilized by administration in a form adapted for intraperitoneal administration. Thus, the compounds can be in the form of a solution or suspension suitable for intra-peritoneal administration.

The CNS stimulant properties are shown when the compounds are administered intra-peritoneally to mice in doses of 10–100 mg./kg. These dosages produce an increase in the rate of respiration, some vasodilatation, and an increased irritability of the test animals.

The invention is further illustrated by the following specific examples.

EXAMPLE 1

3-t-butylamino-3-methyl-1-bromo-2-butanone hydrobromide

To 41.4 g. of 3-t-butylamino-3-methyl-2-butanone contained in a one-liter, three-neck flask equipped with mechanical stirrer and protected from atmospheric moisture were added 300 ml. of glacial acetic acid. The reaction mixture was cooled in an ice bath, and dry hydrogen bromide gas was passed into the stirred mixture for about one-half hour. The tube for introducing the hydrogen bromide was then replaced with a dropping funnel protected from atmospheric moisture. Through the dropping funnel, 42.0 g. of bromine were added dropwise to the stirred mixture at room temperature over a period of one hour. Crystalline material began to appear after about one-half the bromine had been added.

When addition was complete, the reaction mixture was allowed to stir at ambient room temperature for five additional hours.

The crude, crystalline product, after being filtered off and pressed dry, weighed 81.3 g. After being recrystallized from chloroform, the 3-t-butylamino-3-methyl-1-bromo-2-butanone hydrobromide had a melting point of about 165° C. (dec.) and weighed about 80.8 g.

*Analysis.*—Calc'd: C, 34.09%; H, 6.04%; Br, 50.4%. Found: C, 34.35%; H, 6.27%; Br, 50.08%.

EXAMPLE 2

1-t-butyl-2,2-dimethyl-3-azetidinone

A mixture of 24 g. of sodium bicarbonate and 100 ml. of dimethylformamide was prepared in a 500 ml., three-neck, round-bottom flask equipped with a mechanical stirrer, an inlet tube through which nitrogen was introduced, and a dropping funnel. To the stirred mixture under a nitrogen atmosphere was added in one portion a solution composed of 23.7 g. of 3-t-butylamino-3-methyl-1-bromo-2-butanone hydrobromide dissolved in 50 ml. of dimethylformamide. After stirring under nitrogen for about 30 minutes, water was added dropwise until the volume of the mixture had doubled. Some warming of the reaction mixture occurred. Stirring was continued under nitrogen for two additional hours.

The reaction product mixture was worked up by diluting the basic solution with an equal volume of water and extracting three times with 100 ml. portions of ether. The aqueous layer was then made strongly basic (pH= 10–12) with sodium hydroxide and extracted twice more with 100 ml. portions of ether. The combined ether extracts, containing the crude amine product, were washed once with about 100 ml. of water and then extracted with about 150 ml. of dilute, aqueous hydrochloric acid, thus forming the hydrochloride salt of the 3-azetidinone. The aqueous acidic solution was washed with about 150 ml. of ether to remove impurities, and then the aqueous layer was made basic with sodium hydroxide. The basic mixture was extracted with three 100 ml. portions of ether to recover the crude product and the aqueous layer was discarded. The combined ether extracts were washed once with 100 ml. of distilled water. The ether solvent was removed by distillation under nitrogen and the oily residue dried by azeotrpoic distillation of any water present with about 50–100 ml. of benzene, again under nitrogen. Final fractional distillation was done using a 24-inch spinning band column. 1-t-butyl-2,2-dimethyl-3-azetidinone having a boiling point of about 96° C./51 mm. and $n_D^{25}=1.4388$ was obtained. The structure was confirmed by infrared and N.M.R. spectra and by elemental analysis.

*Analysis.*—Calc'd: C, 69.60%; H, 11.04%; N, 9.03%. Found: C, 70.40%; H, 11.16%; N, 9.29%.

The 3-azetidinone free base darkens rapidly in air, apparently decomposing in the process. It was, therefore, exposed to the atmosphere as little as possible after being distilled.

A 3.0 g. sample of 1-t-butyl-2,2-dimethyl-3-azetidinone was dissolved in about 50 ml. of chloroform and treated with an ethanolic hydrogen chloride solution at 0° C. The solvents were removed in vacuo, and the crude residue was recrystallized from methyl ethyl ketone under anhydrous conditions to yield 1-t-butyl-2,2-dimethyl-3-azetidinone hydrochloride as a solid having a melting point of about 115–118° C., and weighing 2.3 g. The structure was confirmed by the infrared spectrum.

EXAMPLE 3

1-t-butyl-2,2-dimethyl-3,3-azetidinediol hydrochloride

Recrystallization of crude 1-t-butyl-2,2-dimethyl-3-azetidinone hydrochloride from a mixture of acetone, water, and methyl ethyl ketone yielded 1-t-butyl-2,2-dimethyl-3,3-azetidinediol hydrochloride having a melting point of about 122–123° C. The product was identified by the infrared spectrum and elemental analysis.

*Analysis.*—Calc'd: C, 51.70%; H, 9.60%; O, 15.24%. Found: C, 52.33%; H, 9.78%; O, 15.45%.

EXAMPLE 4

1-t-butyl-2,2-dimethyl-3-azetidinol

A solution of 9 g. of sodium borohydride in 150 ml. of anhydrous methanol was prepared in a 500 ml. three-neck flask cooled to 0° C. To this solution 1-t-butyl-2,2-dimethyl-3-azetidinone, 4.1 g., dissolved in 50 ml. of anhydrous methanol, was added dropwise with stirring. When the addition was complete, the cooling bath was removed. As the mixture warmed gradually to room temperature, a vigorous reaction occurred. When this reaction had subsided, the mixture was refluxed for about two hours.

The reaction product mixture was cooled to room temperature, diluted with an equal volume of water, and acidified (pH=2) with aqueous 10 percent hydrochloric acid. Most of the solvent methanol was removed in vacuo leaving a semisolid residue. The residue was dissolved in water and the solution washed three times with 100-ml. portions of ether to remove unwanted impurities. The aqueous solution was basified with sodium hydroxide, extracted with three 100-ml. portions of chloroform, dried, and the solution acidified by adding ethanolic hydrogen chloride thereto. The solvents were removed in vacuo leaving a residue. The residue was triturated with ether and a crude crystalline material was filtered off and recrystallized from a mixture of methyl ethyl ketone and methanol to yield 2.5 g. of 1-t-butyl-2,2-dimethyl-3-azetidinol hydrochloride having a melting point of about 152–153° C. with slow decomposition.

*Analysis.*—Calc'd: C, 55.80%; H, 10.41%; N, 7.23%. Found: C, 55.75%; H, 10.30%; N, 7.29%.

EXAMPLE 5

1-t-butyl-2,2-dimethyl-3-chloroazetidine

A suspension of 10 g. of 1-t-butyl-2,2-dimethyl-3-azetidinol hydrochloride in 60 ml. of carbon tetrachloride was prepared in a small flask, and 14.8 g. of thionyl chloride were added. The mixture was swirled and warmed on the steam bath until complete solution of all solid material had occurred. It was then refluxed on the steam bath for about six hours.

The solvent was removed in vacuo and the brown residue recrystallized from ethyl acetate, using decolorizing carbon in the process. A total of about 4 g. of brown, crystalline product was obtained. The infrared spectrum was compatible with the structure of 1-t-butyl-2,2-dimethyl-3-chloroazetidine hydrochloride.

EXAMPLE 6

1-t-butyl-2,2-dimethyl-3-acetoxyazetidine

A mixture of 510 mg. of 1-t-butyl-2,2-dimethyl-3-azetidinol hydrochloride and 5 ml. of acetic anhydride was heated on the steam bath for about two hours. The excess acetic anhydride was removed in vacuo to leave a crystalline solid residue of crude 1-t-butyl-2,2-dimethyl-3-acetoxyazetidine hydrochloride. This material was recrystallized from methyl ethyl ketone and had a melting point of about 155–155.5° C. with decomposition.

*Analysis.*—Calc'd: C, 56.04%; H, 9.40%; N, 5.94%. Found: C, 56.71%; H, 9.58%; N, 6.15%.

EXAMPLE 7

1-t-butyl-2,2-dimethyl-3-phenylazetidine

A Grignard reagent was prepared in about 150 ml. of ether under a nitrogen atmosphere from 8.95 g. of bromobenzene and 1.44 g. of magnesium turnings. To the resulting Grignard reagent were added 4.0 g. of solid 1-t-butyl-2,2-dimethyl-3-chloroazetidine hydrochloride portionwise at room temperature with stirring, and stirring was continued for two hours after the addition was complete. The reaction product mixture was treated with dilute hydrochloric acid and the ether layer was separated and washed with water.

The acidic aqueous layer was treated in the manner described in Example 2, above. The crude hydrochloride addition salt thus obtained was recrystallized from a mixture of methyl ethyl ketone and methanol to give 3.4 g. of 1-t-butyl-2,2-dimethyl-3-phenylazetidine hydrochloride having a melting point of about 186–189° C.

*Analysis.*—Calc'd: C, 70.98%; H, 9.53%; N, 5.52%. Found: C, 70.73%; H, 9.82%; N, 5.67%.

EXAMPLE 8

1-t-butyl-2,2-dimethyl-3-phenyl-3-azetidinol hydrochloride

The subject compound was prepared by adding ca. 3.0 g. of 1-t-butyl-2,2-dimethyl-3-azetidinone to an excess of phenyllithium in anhydrous ether. The reaction was worked up by adding a slurry of ice and water, and the crude amine was extracted with about 100 ml. of ether. The ether solvent was removed in vacuo and any water remaining was removed by azeotropic distillation with about 30 ml. of benzene.

To a 100-ml. benzene solution of the crude product, ethanolic hydrogen chloride was added dropwise until the mixture tested acid. The solvents were removed in vacuo and the residual solid was recrystallized from a mixture of a methyl ethyl ketone and methanol to give 1.45 g. of 1-t-butyl-2,2-dimethyl-3-phenyl-3-azetidinol hydrochloride having a melting point of about 198° C. (dec.).

*Analysis.*—Calc'd: C, 66.77%; H, 8.47%; N, 5.19%. Found: C, 66.48%; H, 9.19%; N, 5.09%.

EXAMPLE 9

3-ethylamino-3-methyl-1-chloro-2-butanone hydrochloride

Twenty grams of 3-ethylamino-3-methyl-2-butanone hydrochloride were placed in a suitably equipped 500 ml., three-neck flask, and about 200 ml. of glacial acetic acid were added with stirring. Complete solution of the solid salt was obtained. Dry hydrogen chloride gas was passed into the solution for about 20 minutes. Chlorine gas was then passed into the reaction mixture for about three hours with continuous stirring, after which the reaction mixture was warmed for a period of time with a hot water bath.

When the reaction was complete, the mixture was cooled to 0° C. The solid which separated was filtered off. Repeated ether washings removed any frozen acetic acid which might have been collected in the filtration. A second crop of crude, crystalline product was recovered from the filtrate. The two crops of crystals were combined and recrystallized from a mixture of methyl ethyl ketone and methanol to give 11.7 g. of 3-ethylamino-3-methyl-1-chloro-2-butanone hydrochloride having a melting point of about 204–205° C.

*Analysis.*—Calc'd: C, 42.02%; H, 7.56%; N, 7.00%. Found: C, 42.38%; H, 7.54%; N, 7.56%.

EXAMPLE 10

1-ethyl-2,2-dimethyl-3-azetidinone

Following the procedure as outlined in Example 2, but using 11.0 g. of 3-ethylamino-3-methyl-1-chloro-2-butanone hydrochloride dissolved in about 150 ml. of methanol and 10 g. of sodium bicarbonate dissolved in the minimum amount of water as principal reactants, 1-ethyl-2,2-dimethyl-3-azetidinone was obtained. A small amount of the free base, dissolved in benzene, was used to prepare the hydrochloride addition salt, 1-ethyl-2,2-dimethyl-3-azetidinone hydrochloride, which was obtained as an uncrystallizable gum. The non-crystalline product gave a peak in the infrared absorption curve (1835 cm.$^{-1}$) corresponding to that required for the carbonyl group in a molecule having the 3-azetidinone structure.

The crude free base darkened rapidly on standing, so was used immediately as described in the succeeding example.

EXAMPLE 11

1-ethyl-2,2-dimethyl-3-phenyl-3-azetidinol

A solution of 18.5 g. of the crude 1-ethyl-2,2-dimethyl-3-azetidinone in 100 ml. of dry ether was added to an excess of phenyllithium in about 100 ml. of anhydrous ether.

An ice-water slurry was added to decompose the reaction product mixture and the crude free base was extracted with about 150 ml. of ether. The solvent was evaporated in vacuo and the residual oil dried in the manner described in previous examples.

The hydrochloride addition salt was prepared by dropwise addition of ethanolic hydrogen chloride to the dry benzene solution of the free base until the mixture was acidic. The solvents were removed in vacuo and the residual solid was recrystallized from a mixture of methyl ethyl ketone and methanol to yield 4.3 g. of 1-ethyl-2,2-dimethyl-3-phenyl-3-azetidinol hydrochloride having a melting point of about 210–211° C. (dec.).

*Analysis.*—Calc'd: C, 64.57%; H, 8.34%. Found: C, 64.38%; H, 8.44%.

EXAMPLE 12

3-methylamino-3-methyl-1-bromo-2-butanone

Following the same procedure as outlined in Example 1, but using 3-methylamino-3-methyl-2-butanone hydrochloride and bromine as the principal starting materials, 3-methylamino-3-methyl-1-bromo-2-butanone hydrobromide was prepared, having a melting point of about 155–156° C.

*Analysis.*—Calc'd: C, 26.20%; H, 4.77%. Found: C, 26.25%; H, 4.81%.

EXAMPLE 13

1,2,2-trimethyl-3-azetidinone

Following the same procedure as described in Example 2, but using 3-methylamino-3-methyl-1-bromo-2-butanone hydrobromide and sodium bicarbonate as the principal reactants, 1,2,2-trimethyl-3-azetidinone was prepared. The structure was confirmed by the infrared and nuclear magnetic resonance spectra.

EXAMPLE 14

1,2,2-trimethyl-3,3-azetidinediol hydrochloride

Using a sample of the crude 1,2,2-trimethyl-3-azetidinone (from Example 13) and following the procedure of Example 3, the crystalline product, a hydrate, 1,2,2-trimethyl-3,3-azetidinediol hydrochloride, identified by infrared spectral analysis, was obtained.

EXAMPLE 15

3-amino-3-methyl-1-bromo-2-butanone

By the same procedure as described in Example 1, but using 3-amino-3-methyl-2 - butanone hydrobromide and bromine as the principal reactants, 3-amino-3-methyl-1-bromo-2-butanone hydrobromide was prepared. A sample for analysis, recrystallized from isopropanol, had a melting point of about 150–152° C.

*Analysis.*—Calc'd: C, 23.01%; H, 4.25%; Br, 61.24%. Found: C, 23.01%; H, 4.20%; Br, 61.45%.

EXAMPLE 16

2,2-dimethyl-3-cyano-3-azetidinol

To a solution of 27.6 g. of sodium bisulfite in a minimal amount of water were added 23 g. of 3-amino-3-methyl-1-bromo-2-butanone hydrobromide. The solution was stirred for one hour at room temperature and a solution of 17.4 g. of sodium cyanide in a small amount of water was added. The reaction mixture warmed slightly. The reaction mixture was stirred for an additional hour. It was then extracted with ether continuously overnight. The ether layer was separated and concentrated in vacuo. On cooling, a crude, crystalline product separated and was recrystallized from acetone. The product, which weighed 2.4 g., was identified by the infrared spectrum as being 2,2-dimethyl-3-cyano-3-azetidinol.

EXAMPLE 17

1,2,2-trimethyl-3-cyano-3-dimethylamino azetidine

In this example the basic procedure of Example 2 was followed but using 23.7 g. of 3-methylamino-3-methyl-1-bromo-2-butanone hydrobromide and 24 g. of sodium cyanide in 100 ml. of dimethylformamide.

The reaction product mixture was made very strongly basic with aqueous sodium hydroxide solution, then stirred overnight with added sodium chloride to aid in salting out the product. Continuous ether extraction was then carried out for a 3-day period.

The ether extract was treated with dry hydrogen chloride gas and the precipitated solid filtered off. This solid was dissolved in water, the aqueous solution basified with sodium hydroxide, and the mixture extracted with ether. The ether solution was dried, concentrated, and fractionated in vacuo through a 24-inch spinning band column to yield a product having a boiling point of about 101–102° C./11–12 mm. The material solidified on standing and had a melting point of about 42–43° C. The product was identified by its infrared and nuclear magnetic resonance (N.M.R.) spectra as 1,2,2-trimethyl-3-cyano-3-dimethylamino azetidine. The N.M.R. spectrum showed five methyl groups.

From these results, it appeared that hydrolysis of the solvent, dimethylformamide, had occurred during the 3-day continuous ether extraction, releasing dimethylamine in the reaction product mixture and allowing the dimethylamine to complicate the reaction and produce the compound obtained.

I claim:

1. A compound of the formula:

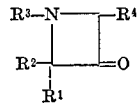

wherein:

$R^1$ and $R^2$, when taken separately, are $C_1$–$C_5$ alkyl or $C_4$–$C_8$ cycloalkyl;
$R^1$ and $R^2$, when taken together with the carbon atom to which they are attached, are $C_4$–$C_8$ cycloalkyl;
$R^3$ is hydrogen, $C_1$–$C_5$ alkyl or $C_4$–$C_8$ cycloalkyl;
$R^4$ is hydrogen, $C_1$–$C_5$ alkyl or $C_4$–$C_8$ cycloalkyl;

or the pharmaceutically acceptable acid addition salts thereof.

2. 1-t-butyl-2,2-dimethyl-3-azetidinone.
3. 1-ethyl-2,2-dimethyl-3-azetidinone.
4. 1,2,2-trimethyl-3-azetidinone.
5. 2,2-dimethyl-3-azetidinone.
6. 1-methyl-2,2-pentamethylene-3-azetidinone.

References Cited

Sandris et al., Bull. Soc. Chim. France, 1958, pp. 345–349.

ALTON D. ROLLINS, Primary Examiner

U.S. Cl. X.R.

260—563, 570.5, 570.6, 574, 577, 584, 999